Jan. 25, 1944.　　　W. R. MILLER　　　2,340,199
FEED CONTROL FOR PLANERS AND THE LIKE
Filed May 14, 1942　　　7 Sheets-Sheet 1

Inventor:-
William R. Miller
by his Attorneys
Howson & Howson

Jan. 25, 1944.   W. R. MILLER   2,340,199
FEED CONTROL FOR PLANERS AND THE LIKE
Filed May 14, 1942   7 Sheets-Sheet 6

Inventor:-
William R. Miller
by his Attorneys
Howson & Howson

Jan. 25, 1944. W. R. MILLER 2,340,199
FEED CONTROL FOR PLANERS AND THE LIKE
Filed May 14, 1942 7 Sheets-Sheet 7
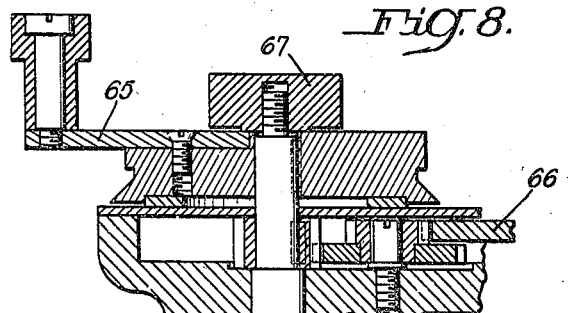
Fig. 8.
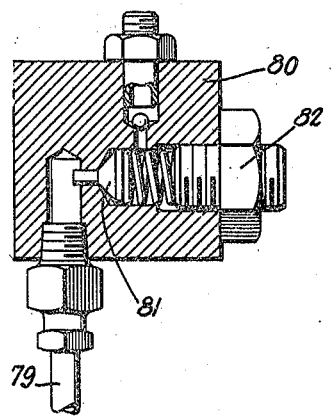
Fig. 9.
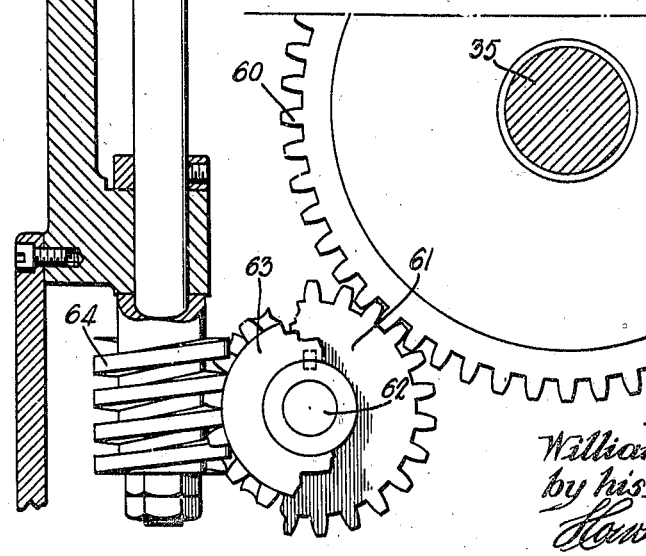
Inventor:-
William R. Miller
by his Attorneys
Howson & Howson Patented Jan. 25, 1944

2,340,199

UNITED STATES PATENT OFFICE 2,340,199

FEED CONTROL FOR PLANERS AND THE LIKE

William R. Miller, Philadelphia, Pa., assignor to Wm. Sellers & Company, Inc., Philadelphia, Pa., a corporation of Pennsylvania Application May 14, 1942, Serial No. 443,016

17 Claims. (Cl. 90—49)

This invention relates to feed control mechanisms for the heads of planers and the like and has for an important object thereof the provision of a magnetic control for the various functions of a feed head, or heads, on tools of this general character.

An important object of the invention is the provision in an apparatus of this character of an extremely simple and efficient magnetic control mechanism which is readily adjustable to determine the extent of feed and to repetitively advance the tool to the work through a selected distance without further attention on the part of the operator.

A still further object of the invention is the production of a simple and convenient magnetic clutch mechanism for use in such a feed.

Another object of the invention is to provide a novel and improved mechanism for returning the feed control to its original setting following each operation thereof, and to provide means to control the speed at which the clutch returns.

Other objects and advantages of the invention will become apparent throughout the course of the following description.

In the accompanying drawings, wherein for the purpose of illustration I have shown my invention as applied to the feed controls of a planer, Fig. 1 is a fragmentary perspective of a planer embodying my feed control;

Fig. 8 is a detail sectional view illustrating the manner of controlling the feed mechanism;

Fig. 9 is a detail sectional view illustrating the method of controlling the pressure-resisting return of the feed control mechanism to its zero position; and Fig. 10 is a wiring diagram illustrating generally the controls for the mechanism.

Figure 1:
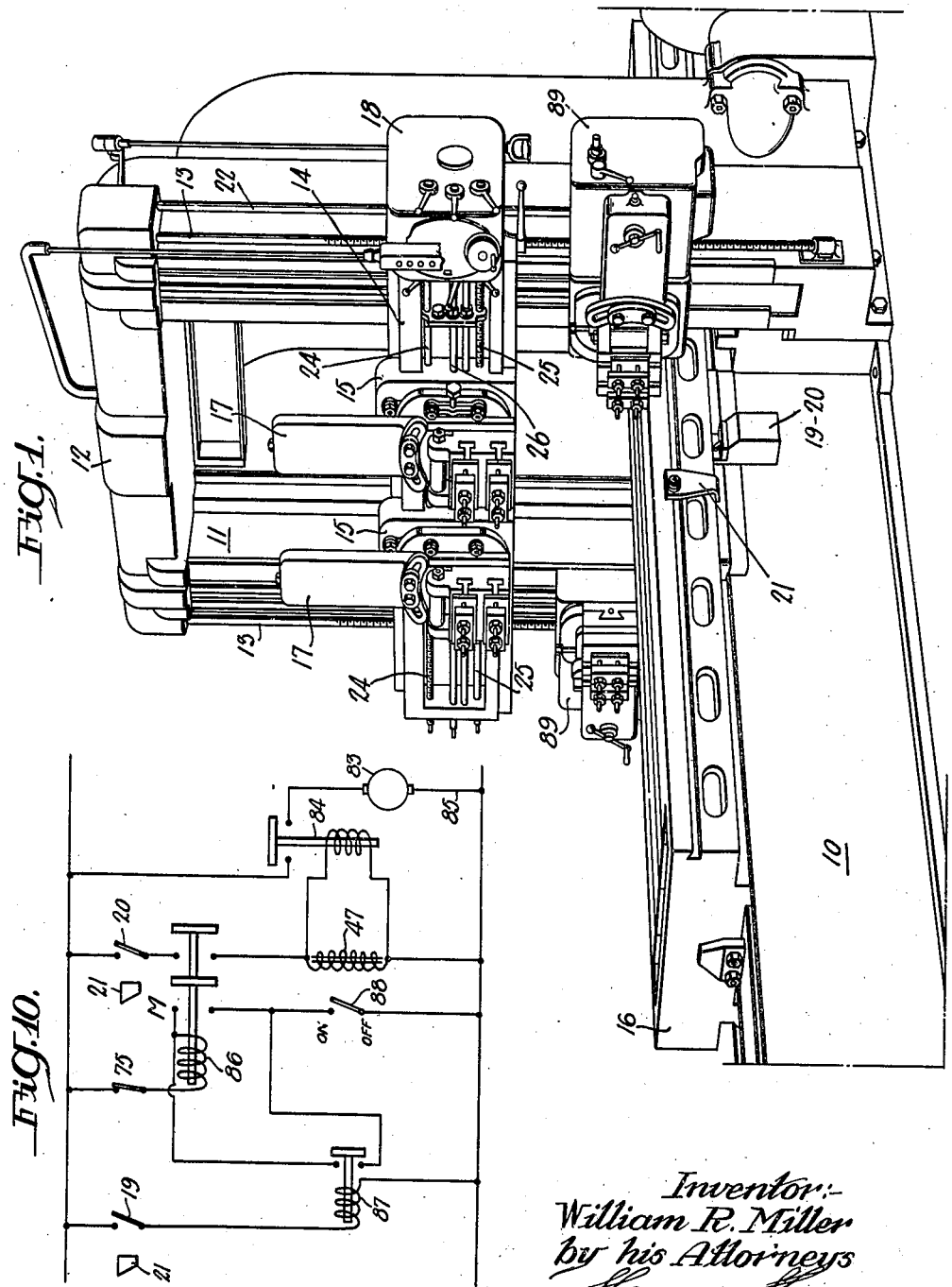

Referring now more particularly to the drawings, the numeral 10 generally designates the bed of a planer from the sides of which housings 11 arise, the upper ends of these housings supporting a head frame 12 which mounts a feed drive motor not herein specifically disclosed. Vertically adjustable along the housings 11 through worms 13 is cross-rail 14 bearing saddles 15 mounting the cutting tools for operating upon work mounted upon a reciprocable table 16 supported by the bed 10. The tool slides 17 of saddles 15 are vertically adjustable and the saddles themselves may be moved longitudinally of the cross-rail 14. At one end of the cross-rail is mounted a control head 18 by which movement of the tool slides and of the saddles themselves is effected. Reciprocation of table 16 upon the bed is controlled through limit switches 19 and 20, these switches being engaged by adjustable trip elements 21 carried by the table. The switches 19 and 20 are combined in a single structure and while only one of the trips 21 appears in Fig. 1, it will be understood that a corresponding trip is disposed at the opposite end of the bed.

Figure 2:
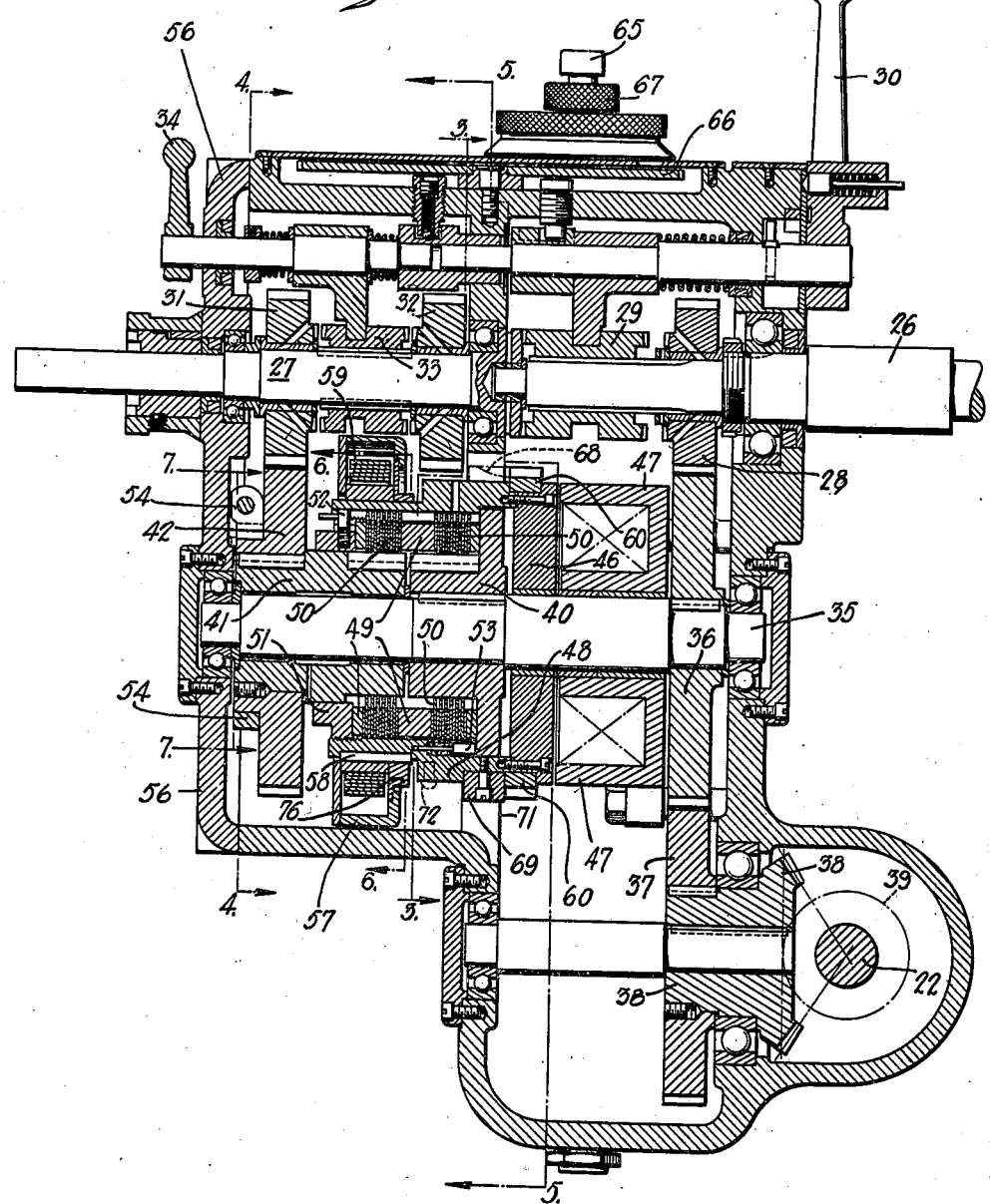
Fig. 2 is a horizontal sectional view through the control mechanism on line 2—2 of Fig. 4.
Figure 3:
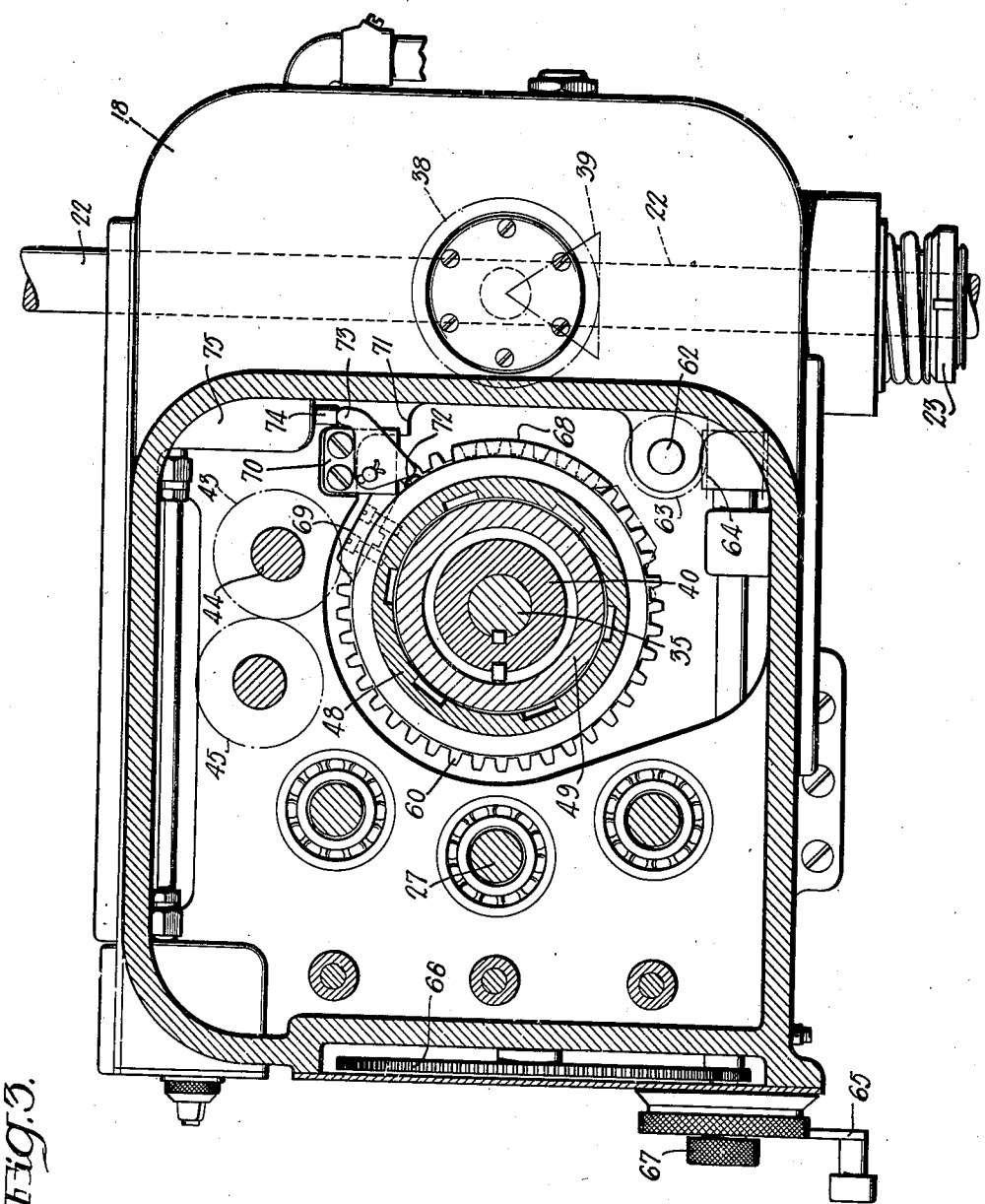
Fig. 3 is a section on line 3—3 of Fig. 2.
Figure 4:
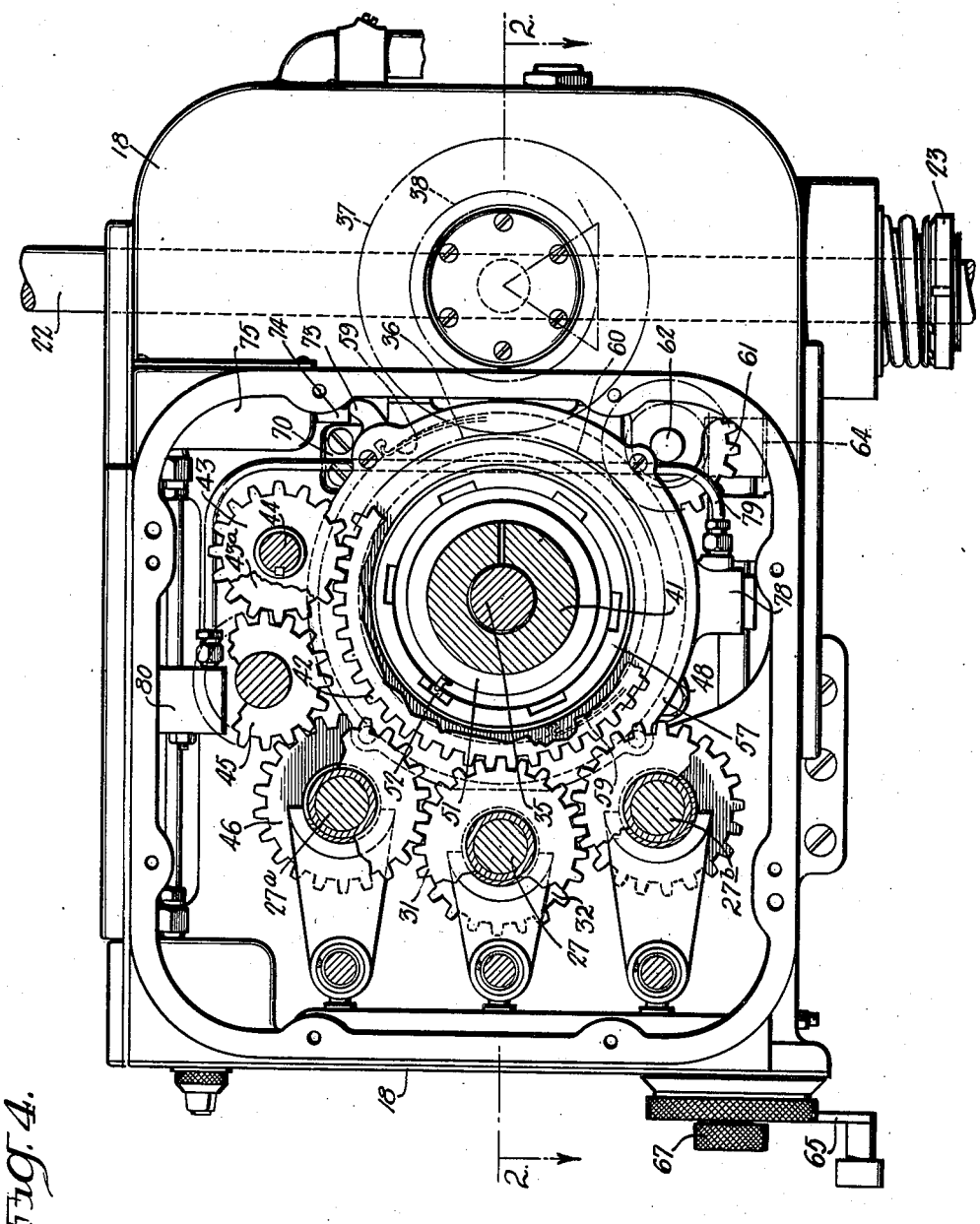
Fig. 4 is a section on line 4—4 of Fig. 2.
Figure 5:
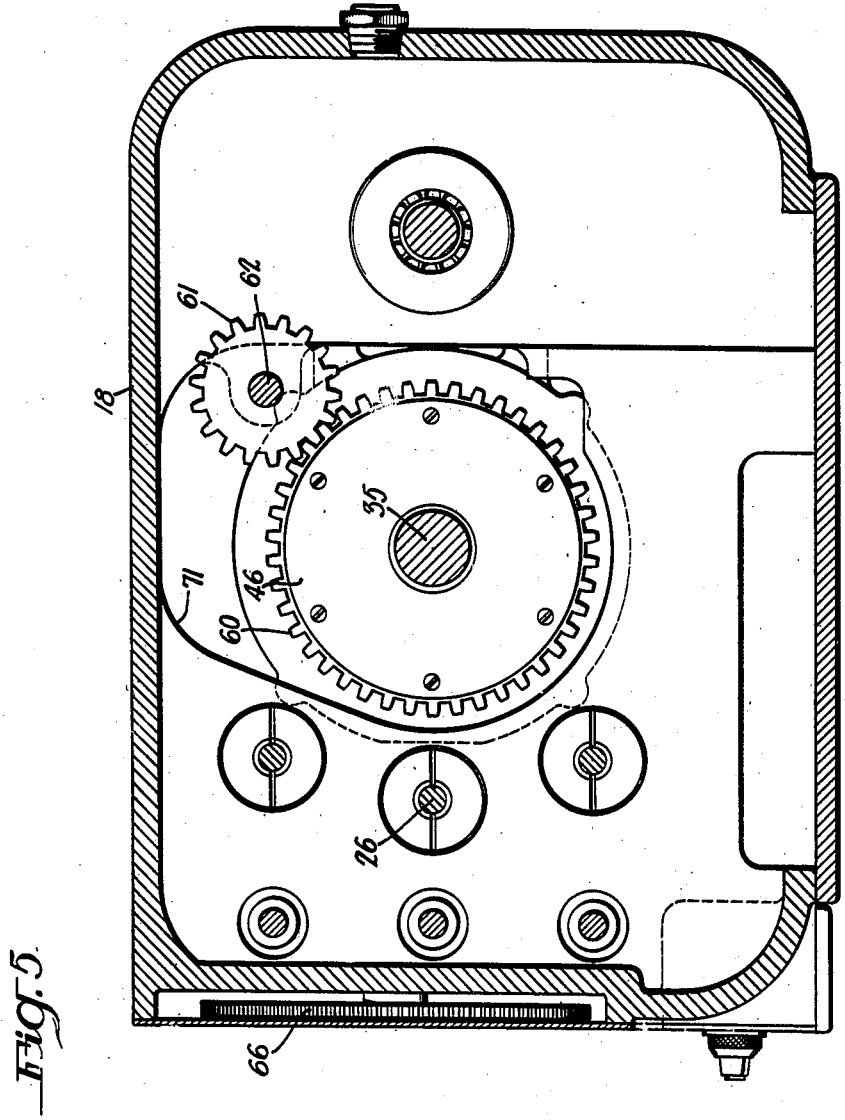
Fig. 5 is a section on line 5—5 of Fig. 2.
Figure 6:
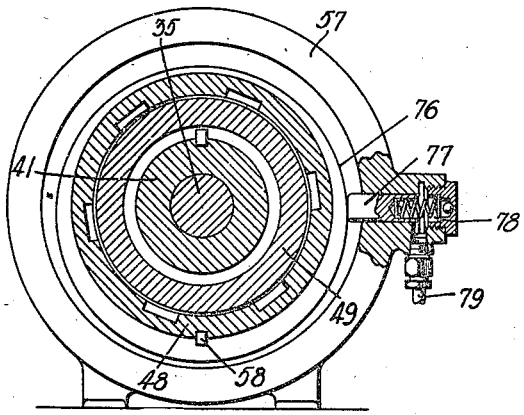
Fig. 6 is a section on line 6—6 of Fig. 2.
Figure 7:
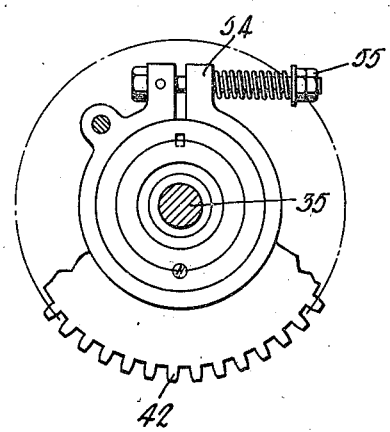
Fig. 7 is a section on line 7—7 of Fig. 2.

The feed motor drives a shaft 22 which projects through the housing of the control head and is engageable with the mechanism of the control head through a clutch mechanism fragmentarily illustrated at 23 in Figs. 3 and 4. Traverse of the saddles 15 in either direction is controlled by worms 24 and 25, one of which controls the movement of each saddle, while vertical movement of the tool slides is controlled by a spline shaft 26 common to both saddles. The ends of worms 24 and 25 and shaft 26 project into the housing of head 18 where each has an identical mounting in and coaction with an associated stub shaft 27a, 27b or 27, respectively, with the result that description of one thereof will suffice. For the purposes of the present discussion the spline shaft 26 is selected. As shown more particularly in Fig. 2, this shaft projects into the housing and has its inner end engaged in a bearing mounted in a head formed on the inner end of an aligned stub shaft 27. It is provided within the housing with a loose gear 28 and with a clutch 29 which is splined to the shaft 26 and may be utilized to selectively connect the gear 28 or the stub shaft 27 to the shaft 26, movements of this clutch being obtained through a shifting arm 30. The stub shaft 27 has rotatably mounted thereon gears 31 and 32 which may be selectively connected to the stub shaft by a splined clutch element 33, operation of which is effected through a shifting handle 34. The gear of stub shafts 27a and 27b corresponding to the gears 31 and 32 are enmeshed therewith as more clearly shown in Fig. 4.

Within the housing there is mounted a shaft 35 having secured thereto a gear 36 which, through pinion 37 and bevel gears 38 and 39 (the latter driven by shaft 22) is driven by the feed motor. Keyed to the shaft 35 is one element 40 of a disc clutch, while rotatable about the shaft is a sleeve 41 forming a second element of this clutch, said sleeve having keyed thereto a gear 42 meshing with the gear 31 of stub shaft 27. The gears corresponding to gears 31 and 32 of shaft 27 but disposed upon stub shafts 27a and 27b do not mesh with the gear 42 as may be seen from an inspection of Figure 4 in which the gear 46 upon stub shaft 27a is the gear corresponding to the gear 32 of stub shaft 27.

To provide for reversal of operation of stub shafts 27, 27a and 27b, a connection is provided between gear 42 and the train of shafts 27, 27a and 27b which includes gears 46 and 32. This connection is at present shown as comprising a shaft 44 bearing gears 43 and 43a of which the gear 43 meshes with the gear 42 and the gear 43a meshes with an idler gear 45 in turn meshing with the gear 46 of stub shaft 27a.

It will be seen that by connecting the shaft 26 to the stub shaft 27 and thereby disconnecting this shaft from the gear 36, shaft 26 may be driven in either direction from gear 42 through suitable selection effected at the control handle 34. Reverse operation of shaft 26 may also be obtained from gear 36 by connecting shaft 26 thereto and controlling the direction of operation of the feed motor, this latter connection being employed in traverse movements of the tool slide of either saddle. It will be understood that corresponding operation of the saddles themselves may be obtained by rendering effective the feed worms thereof, these worms being driven from the gear 28 by intermeshing gears arranged upon worms 24 and 25.

Longitudinally shiftably mounted upon the shaft 35 is an armature element 46 associated with a magnet 47 stationarily supported by casing 18. This armature element includes a housing sleeve 48 surrounding the clutch element 40 and the inner end of the clutch element 41. Arranged within the housing formed by sleeve 48 and the clutch elements 40, 41 is a sectional clutch ring 49. Each of the clutch elements 40 and 41 includes a series of plates 50 held against rotation with relation thereto and interengaged with corresponding clutch plates held against rotation with relation to sleeve 48. The outer end of the housing sleeve 48 has adjustably mounted thereon a clamping collar 51 adjustment of which is effected through threaded engagement between the sleeve and collar and maintained by means of a latch 52. It will be obvious that upon operation of the magnet 47 the housing sleeve, through armature 46, is drawn to the right (Fig. 2), thereby clamping the plates of the clutch to one another and connecting elements 40 and 41 of the clutch together for simultaneous rotation with one another and with shaft 35, thereby rotating gear 42. Means are provided as at 53 for separating the plates of the clutch upon de-energization of magnet 47, thus freeing the clutch sections from one another and enabling gear 42 to remain stationary during reverse movement of the clutch sleeve, as hereinafter described. To insure against reverse movement of gear 42, this gear has associated therewith a brake 54 the tension of which may be adjusted as at 55. Brake 54 is secured to the housing of head 18, and more particularly to a removable front plate 56 thereof.

Surrounding the sleeve 48 is a spring housing 57. This housing is formed in inner and outer sections, the outer section being fixed to the housing of head 18 while the inner is keyed as at 58 to sleeve 48 in a manner permitting a slight longitudinal movement of the sleeve therethrough. A coil spring 59 has its inner end secured to the inner housing section, and its outer end secured to the outer housing section, the spring being coiled in such fashion that upon each operation of the clutch in a given direction the spring is tensioned and thus serves as a means for restoring the sleeve 48 and the associated armature 46 to their normal position upon de-energization of magnet 47.

The limits of the rotation which may be effected by the clutch elements is controlled in one direction through a ring gear 60 rotatably supported by armature 46 and sleeve 48 and adjustable to a selected fixed position. In the present instance ring gear 60 is shown as meshing with a pinion 61 mounted upon a stub shaft 62. Stub shaft 62 has a worm gear 63 engaged by a worm 64 which may be rotated through a control handle 65. Preferably, the control handle 65 additionally operates a dial 66 which provides the operator an indication of the extent of the feed. It will be obvious that the worm and gear connection between the operating handle and gear 60 will provide an effective lock against accidental rotation of the gear 60 but additional locking means may be provided if so desired and these are generally designated at 67. Ring gear 60 has an axially projecting segment 68 arranged in the path of a stop 69 carried by sleeve 48 which serves to limit rotation of the sleeve 48 in one direction. The housing of head 18 includes a fixed stop 70 at present shown as secured to a partition 71 in the housing of head 18 which positively limits rotation of sleeve 48 in the opposite direction. Sleeve 48 includes a cam element 72 which, as stop 69 engages fixed stop 70, comes into engagement with a lever 73 and through this lever actuates the plunger 74 of a limit switch 75 opening the circuit of magnet 47 and thereby disconnecting sections 40 and 41 of the clutch. As previously noted, when the sections of the clutch are released, the loaded spring 59 will reversely rotate sleeve 48 until the stop 69 engages the projecting segment 68 of gear 60 when its reverse movement is checked.

In order to control the speed of return of the sleeve 48 to its zero position and thus avoid unnecessary shocks to the mechanism, I provide the sleeve 48 with an eccentric 76 and utilize this eccentric to actuate the plunger 77 of a pump 78. Pump 78 is disposed below the normal oil level within the head 18 and the effluent from this pump is led through a conduit 79 to an outlet 80 controlled by a spring-seated check valve 81, the pressure of the spring of which is adjustable as at 82. Adjustment of check valve 81 permits the speed of return of the sleeve to be accurately gauged and thus determines the minimum interval between successive feeds.

In the operation of the mechanism above described, let it be assumed that the master switch M and switch 20 controlling the operation of the feed motor 83 and the circuit of magnet 47 are so set that the circuit on the magnet 47 is completed. Completion of this circuit likewise completes, through relay 84, the circuit 85 of feed motor 83 thereby driving shaft 35 and clutching together the sections 40 and 41 of the magnetic clutch, with the result that gear 42, housing sleeve 48, and the magnet rotate as a unit driving stub shaft 27 and shaft 26 which, at this time, will be connected to stub shaft 27 through clutch 29. The direction of rotation actually imparted to shaft 26 may be selected by clutch 33. As rotation of housing sleeve 48 continues, the stop 69 engages the fixed stop 70. Immediately prior to this engagement the cam 72 upon sleeve 48 engages lever 73 and thereby opens switch 75, thus releasing the holding coil 86 of master switch M and permitting this switch to open. The clutch elements are thus released from one another, permitting housing sleeve 48 to rotate reversely until stop 69 again engages the projecting segment 68 of ring gear 60. While switch 75 will again close immediately upon recession of the cam element 72 therefrom, the circuit of the master switch will not be re-established due to the fact that the circuit of the holding coil will be open at the relay 87. A successive feeding operation is, therefore, impossible until the table movement has closed both of switches 20 and 19, such closing occurring in the sequence named. Switch 20 will be closed on the start of the return movement of the table, and switch 19 at the close of this return movement, thus rendering it impossible to automatically repeat the feed movement until the cutting stroke has been completed. With the closing of switch 19 the circuit of the coil 86 is closed, assuming that "on-off" switch 88 is closed and the selected feed movement will again be repeated.

While I have illustrated my invention as applied to the control head of the cross-rail of a planer, it will be obvious that the construction illustrated is capable of adaptation to a vast number of similar control devices as, for example, to the control of side heads for planers such as that illustrated at 89 in Fig. 1.

Since the construction is obviously capable of considerable modification without departing from the spirit of my invention, I do not wish to be understood as limiting myself to that herein illustrated except as hereinafter claimed.

I claim:

1. In a feed control of the type described, a feed shaft, means for selectively driving said shaft in either direction comprising a clutch element rotatable in opposite directions, means positively defining the limits of rotation of said clutch in either direction, means operatively connecting the clutch element and shaft during rotation of said element in one direction only, means to prevent rotation of the shaft during rotation of the clutch element in the opposite direction, and means for controlling the speed of movement of the clutch in the last-named direction.

2. In a feed control of the type described, a feed shaft, means for selectively driving said shaft in either direction comprising a clutch element rotatable in opposite directions, means including fixed and adjustable stops positively defining the limits of rotation of said clutch in either direction, means operatively connecting the clutch element and shaft during rotation of said element in one direction only, means to prevent rotation of the shaft during rotation of the clutch element in the opposite direction, and means for controlling the speed of movement of the clutch in the last-named direction.

3. In a feed control of the type described, a plurality of feed shafts, means for selectively driving said shafts including a clutch element rotatable in opposite directions, means positively defining the limits of rotation of said clutch element in either direction, means to operatively connect said clutch element and a selected one of said shafts during rotation of said clutch element in one direction, means to prevent rotation of the selected shaft during rotation of the clutch element in the opposite direction and means for controlling the speed of movement of the clutch section in the last-named direction.

4. In a feed control of the type described and in combination, a reciprocable table, switch means controlling the extent of reciprocation of the table, a carrier shiftable in a direction transverse to the direction of table travel, means controlling operation of the carrier comprising a drive shaft, a worm for advancing the carrier, a clutch to connect the drive and worm shafts, means to engage said clutch operable at one limit only of the table travel and means to prevent repetitive operation of said clutch until the cycle of operation of the reciprocable table is completed.

5. In a feed control of the type described and in combination, a reciprocable table, switch means controlling the extent of reciprocation of the table, a carrier shiftable in a direction transverse to the direction of table travel, means controlling operation of the carrier comprising a drive shaft driven in one direction only, a worm for advancing the carrier, means to connect the worm and said drive shaft including a clutch element rotatable in opposite directions, means including an adjustable stop for limiting rotation of said clutch element in opposite directions, means to positively connect the drive shaft and clutch element during rotation of the clutch element in one direction, means to disconnect the drive shaft and worm from said clutch element after a selected rotation of the clutch element, means to reversely rotate the clutch element when disconnected and means to prevent repetitive operation of said clutch element during a cycle of operation of the reciprocable table.

6. In a feed control of the type described and in combination, a reciprocable table, switch means controlling the extent of reciprocation of the table, a carrier shiftable in a direction transverse to the direction of table travel, means controlling operation of the carrier comprising a drive shaft driven in one direction only, a worm for advancing the carrier, means to connect the worm and said drive shaft including a clutch element rotatable in opposite directions, means including an adjustable stop for limiting rotation of said clutch element in opposite directions, means to positively connect the drive shaft and clutch element during rotation of the clutch element in one direction, means to disconnect the drive shaft and worm from said clutch element after a selected rotation of the clutch element, means to reversely rotate the clutch element when disconnected, and means to prevent repetitive operation of said clutch element during a cycle of operation of the reciprocable table comprising a motor to drive said drive shaft, a normally open circuit therefor and means to prevent closing of said motor circuit until said limit switches have been cyclically operated.

7. In a feed control of the type described and in combination, a reciprocable table, switch means controlling the extent of reciprocation of the table, a cutting tool carrier shiftable in a direction transverse to the direction of table travel, means controlling operation of the carrier comprising a drive shaft, a worm for advancing the cutter carrier, means to connect the worm and said drive shaft including a clutch element rotatable in opposite directions, means including an adjustable stop for limiting rotation of said clutch element in opposite directions, means to positively connect the drive shaft and clutch element during rotation of the clutch element in one direction, means to disconnect the drive shaft and said clutch element after a selected rotation of the clutch element, means activated during positive connection of the drive shaft and clutch for returning the clutch element to a predetermined normal position, means for preventing operation of the worm during return movement of said clutch element and means to prevent repetitive operation of said clutch element during a cycle of operation of the reciprocable table.

8. In a feed control of the type described, a feed shaft, means for selectively driving said shaft in either direction comprising a clutch element rotatable in opposite directions, means positively defining the limits of rotation of said clutch in either direction, means operatively connecting the clutch element and shaft during rotation of said element in one direction only, means to prevent rotation of the shaft during rotation of the clutch element in the opposite direction, means to rotate the clutch element in the last-named direction, a fluid pressure system charged by and resisting rotation of the clutch element in the last named direction, and an adjustable escape port for said fluid pressure system.

9. In a feed control of the type described, a feed shaft, means for selectively driving said shaft in either direction comprising a clutch element rotatable in opposite directions, means including fixed and adjustable stops positively defining the limits of rotation of said clutch in either direction, means operatively connecting the clutch element and shaft during rotation of said element in one direction only, means to prevent rotation of the shaft during rotation of the clutch element in the opposite direction, means to rotate the clutch element in the last-named direction, a fluid pressure system charged by and resisting rotation of the clutch element in the last named direction, and an adjustable escape port for said fluid pressure system.

10. In a feed control of the type described, a plurality of feed shafts, means for selectively driving said shafts including a clutch element rotatable in opposite directions, means positively defining the limits of rotation of said clutch element in either direction, means to operatively connect said clutch element and a selected one of said shafts during rotation of said clutch element in one direction, means to rotate the clutch element in the opposite direction, means to prevent rotation of the selected shaft during rotation of the clutch element in the opposite direction, a fluid pressure system charged by rotation of the clutch element in the last named direction and resisting rotation of the clutch element in the last-named direction, and an adjustable escape port for said fluid pressure system.

11. In a feed control of the type described, a feed shaft, means for selectively driving said shaft in either direction comprising a drive shaft, a reversing mechanism for said feed shaft, a magnetic clutch connecting said drive shaft and reversing mechanism including an element movable in one direction under influence of the clutch and in the opposite direction under influence of a spring, adjustable means limiting movement of said element in one direction, means for opening the circuit of the magnetic means to thereby limit movement of the element in the opposite direction and means to prevent rotation of the shaft during movement of said element under influence of the spring.

12. In a feed control of the type described, a feed shaft, means for selectively driving said shaft in either direction comprising a drive shaft, a reversing mechanism for said feed shaft, a magnetic clutch connecting said drive shaft and reversing mechanism including an element movable in one direction under influence of the clutch and in the opposite direction under influence of a spring, adjustable means limiting movement of said element in one direction, means for opening the circuit of the magnetic means to thereby limit movement of the element in the opposite direction, means to prevent rotation of the shaft during movement of said element under influence of the spring and means to control the speed of movement of said element under influence of the spring.

13. In a machine tool having a drive, a work support and a tool holder, means including a friction clutch for causing relative feeding movement between said work support and tool holder, means mechanically limiting the movement of said clutch and the feeding movement, means including a first switch to cause engagement of said clutch, cyclically operated switching means for energizing the first switch, and means including a second switch operated by said clutch at the close of a feeding movement for deenergizing said first switch.

14. In a machine tool having a drive, a work support and a tool holder, means including a friction clutch for causing relative feeding movement between said work support and tool holder, means mechanically limiting the movement of said clutch and the feeding movement, means including a first switch to cause engagement of said clutch, cyclically operated switching means for energizing the first switch and completing a holding circuit therefor, and means including a second switch operated by said cluth at the close of a feeding movement for opening the holding circuit of said first switch.

15. In a machine tool having a drive, a work support and a tool holder, means including a friction clutch for causing relative feeding movement between said work support and tool holder, a motor to drive the driven element of said clutch in one direction, means mechanically limiting the movement of said clutch and the feeding movement, means including a first switch to cause engagement of said clutch, cyclically operated switching means for energizing the first switch, means including a second switch operated by said clutch at the close of a feeding movement for deenergizing said first switch, and a spring to reversely rotate said clutch to a predetermined position when disengaged.

16. In a machine tool having a drive, a work support and a tool holder, means including a friction clutch for causing relative feeding movement between said work support and tool holder, a motor to drive the driven element of said clutch in one direction, means mechanically limiting the movement of said clutch and the feeding movement, means including a first switch to cause engagement of said clutch, cyclically operated switching means for energizing the first switch, means including a second switch operated by said clutch at the close of a feeding movement for deenergizing said first switch, a spring to reversely rotate said clutch to a predetermined position when disengaged, and means to control the speed of movement of the clutch when reversely rotated.

17. In a machine tool having a drive, a work support and a tool holder, means including a magnetic friction clutch having a driving element rotated in one direction only and an intermediate element interposed between the driving element and feeding element for causing relative feeding movement between said support and holder, means including the intermediate element of the friction clutch for positively limiting movement of the driven element of the clutch during the feeding movement, means including a first switch to cause engagement of said clutch, cyclically operated switching means for energizing the first switch, means including a second switch operated by the intermediate element of the clutch for deenergizing the first clutch, a spring to reversely rotate the intermediate element of the clutch when the clutch is released, a positive stop limiting rotation of said element under the influence of said spring, and means for adjusting the position of the positive stop to vary the degree of rotation of said intermediate element of the friction clutch and the feeding movement.

WILLIAM R. MILLER.